(No Model.)  
H. J. GEBHARDT.  
FENCE MACHINE.  
3 Sheets—Sheet 1.

No. 435,540. Patented Sept. 2, 1890.

Witnesses:  
J. Jesson  
E. G. Hawley

Inventor  
Henry J. Gebhardt  
By Paul A. Wemmer  
Attorneys (No Model.) 3 Sheets—Sheet 2.
H. J. GEBHARDT.
FENCE MACHINE.

No. 435,540. Patented Sept. 2, 1890.

Witnesses.
O. G. Hawley
Bessie Booth

Inventor.
Henry J. Gebhardt
By Paul & Merwin
Attorneys.

(No Model.)

H. J. GEBHARDT.
FENCE MACHINE.

No. 435,540.

3 Sheets—Sheet 3.

Patented Sept. 2, 1890.

Witnesses:
C. G. Hawley
Bessie Booth

Inventor
Henry J. Gebhardt
By Paul —— Att'ys

UNITED STATES PATENT OFFICE.

HENRY J. GEBHARDT, OF MINNEAPOLIS, MINNESOTA.

FENCE-MACHINE.

SPECIFICATION forming part of Letters Patent No. 435,540, dated September 2, 1890.

Application filed May 15, 1890. Serial No. 351,860. (No model.)

*To all whom it may concern:*

Be it known that I, HENRY J. GEBHARDT, of Minneapolis, in the county of Hennepin and State of Minnesota, have invented certain new and useful Improvements in Fence-Machines, of which the following is a specification.

This invention relates to improvements in machines for making wire-and-picket fencing; and the objects I have in view are to provide a machine of the class known as "hand-power machines," upon which the fence may be rapidly and efficiently made either with direct or reverse twists; and the invention consists, generally, in the construction and combination hereinafter described, and particularly pointed out in the claims.

Figure 1:
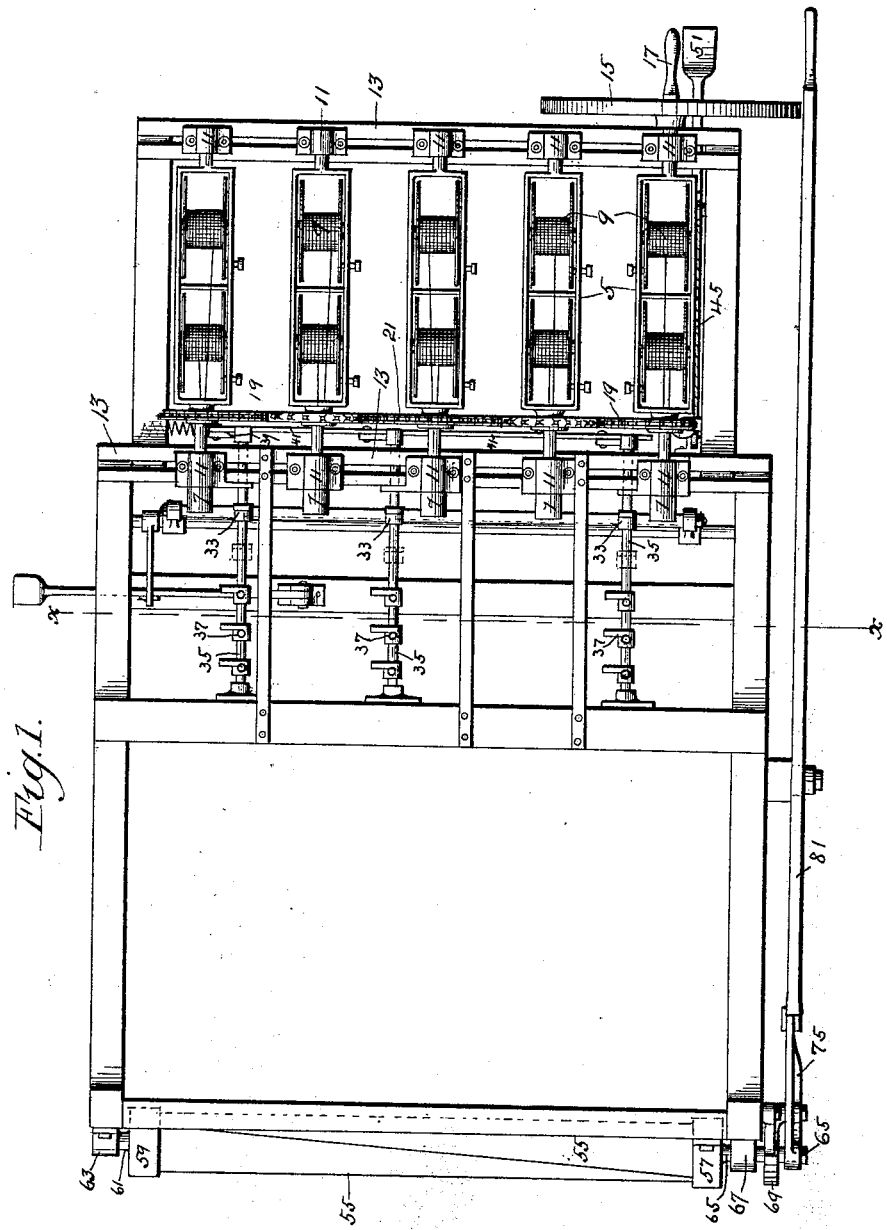
Figure 2:
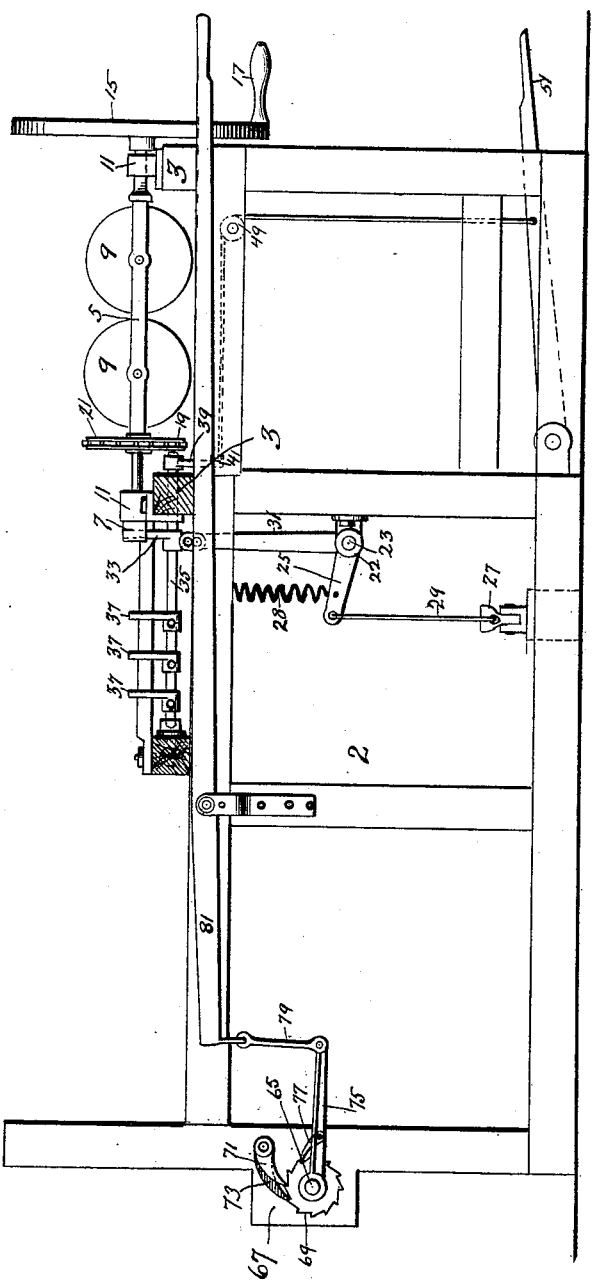
Figure 3:
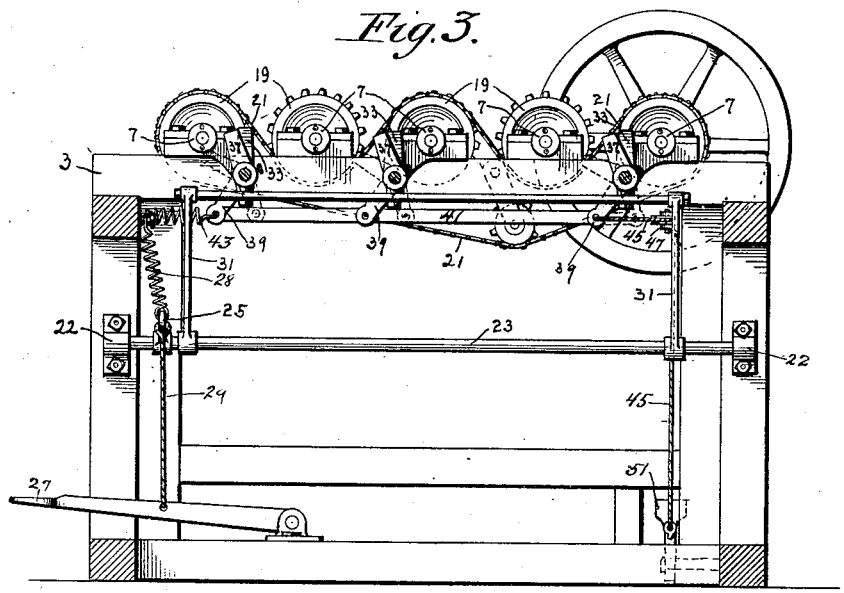

In the accompanying drawings, forming part of this specification, Figure 1 is a plan view of a machine embodying my invention. Fig. 2 is a side elevation of the same. Fig. 3 is a sectional end elevation on line $x$ $x$ of Fig. 1.

In the drawings, 2 represents the frame-work of the machine, which may be of any suitable construction, and having suitable cross-bars or timbers 3, upon which the spool-frames 5, carrying the twister-heads 7, are mounted. These spool-frames are of ordinary construction, and they have mounted in them in any ordinary or preferred manner the spools 9, which carry the wire for the fence.

The spool-frames are mounted in bearings 11 upon the cross-bars, and these bearings are preferably secured upon a rib 13 upon the top of the cross-bar, so as to be capable of being adjusted thereon. A wheel 15, having a handle 17, is secured upon the shaft of one of the spool-frames, and the shaft of each spool-frame is provided with a sprocket-wheel 19. A chain 21 extends around and connects all of these sprocket-wheels, so that upon turning the wheel 15 by hand all of the spool-frames will be rotated at the same speed. The wires from the spools pass through the twister-heads, and the pickets are fed by hand between the wires and immediately in front of the twister-heads. A rock-shaft 23 is arranged in bearings 22 in front of and below the twisters and is provided with an arm 25, projecting therefrom and connected to a treadle 27 by a rod 29. A spring 28 is connected to the arm 25 and tends to return the rock-shaft to its normal position after it has been operated by the treadle.

To the rock-shaft 23 is secured a series of arms 31, that extend upward and are connected to the picket-pushers 33, that are mounted so as to slide freely on the rods 35, secured to the frame of the machine. These picket-pushers consist of arms that fit loosely upon the rods 35, so that while the picket-pushers are guided by the rods, the rods are free to turn in their bearings without turning the picket-pushers, and the picket-pushers slide freely on the rods. The treadle 27 is located in position to be operated by the person who feeds in the pickets, and after each picket is put in place the treadle is depressed and the picket is thereby moved forward between the wires and against the twist previously made. The rods 35 are mounted in bearings in the frame of the machine, and secured upon each rod is a series of picket-stops 37. These rods 35 are capable of turning on their axes, but have no longitudinal movement.

The picket-stops 37 upon each rod are held in position by means of set-screws and are capable of being adjusted thereon to suit the spacing of the fence that is being made.

Each of the rods 35 is provided with a depending arm 39, and these arms are all connected to a cross-bar 41. A spring 43 is connected to one end of this bar, and it tends to hold the rods 35 with their picket-stops in an elevated position, so that each picket-stop engages and holds one picket of the fence. A cord 45 is connected to the bar 41 and extends over wheels 47 and 49 and is attached to a treadle 51. This treadle is preferably in position to be operated by the person who turns the wheel by which the twists are driven.

The completed fence is wound upon a reel located at the back end of the frame of the machine. This reel consists of the oppositely-arranged diagonal bars 55, having their ends mounted in the caps 57 and 59, the cap 59 being removable. The cap 59 is secured upon a stud 61, that turns in a bearing 63 on the frame.

The cap 57 is secured upon a short shaft 65, mounted in a bearing 67, and on the end of this shaft is a ratchet-wheel 69. Two pawls 71 and 73 are pivoted on the frame of the machine and are arranged to engage this ratchet-wheel. One of these pawls is longer than the other, so that when one pawl is in engagement with a tooth of the wheel the end of the other pawl is midway between two of the teeth. By this arrangement I am enabled to use a large wheel with long teeth and get the advantage of a small movement of the reel.

An arm 75 is pivoted on the shaft 65 and carries a pawl 77, that engages the ratchet-wheel. This arm is connected by a link 79 with a lever 81, that is pivoted on the frame of the machine and extends to a point near the rear end of the machine, where it is in position to be operated by the person who drives the twisters.

In operating the machine the twisters are driven continuously, or they are turned forward and back, so as to reverse the twists. The pickets are fed by hand between the wires, and are then moved forward, so as to be brought into the bight of the wires. The fence as made is drawn forward by the reel, and while the wires are being twisted the fence is held by the picket-stops, thus holding the fence firmly and keeping it straight. When the fence is to be drawn forward, the stops 37 are turned down to a horizontal position, thus permitting the fence to pass.

I claim as my invention—

1. The combination, in a fence-machine, with the twisters, the reel, and means for operating said reel, of the longitudinally-fixed rotatable rods 35, the adjustable picket-stops 37, mounted on said rods, the arms on said rods, the cross-bar connecting said arms, and the treadle connected with said cross-bar, whereby said stops will stand normally in the path of said pickets and by means of said treadle may be turned down to permit said pickets to pass, substantially as described.

2. The combination, in a fence-machine, with the twisters, the reel, and means for operating said reel, of the rods 35, adapted to turn on their axes, the picket-stops 37, secured on said rods, the picket-pushers 33, also mounted on said rods and arranged to slide thereon, and means for reciprocating said picket-pushers 33, substantially as described.

In testimony whereof I have hereunto set my hand this 12th day of April, A. D. 1890.

HENRY J. GEBHARDT.

In presence of—
A. C. PAUL,
A. M. GASKILL.